US010621797B2

(12) United States Patent
Grobler et al.

(10) Patent No.: US 10,621,797 B2
(45) Date of Patent: Apr. 14, 2020

(54) SYSTEM AND METHOD FOR TRANSFERRING DIAGNOSTIC COMMANDS TO A VEHICLE

(71) Applicant: Hex Microsystems (Pty) Ltd, Western Cape (ZA)

(72) Inventors: Jacobus Grobler, Somerset West (ZA); Petrus Johannes Badenhorst, Sea Point (ZA)

(73) Assignee: Hex Microsystems (Pty) Ltd, Western Cape (ZA)

( * ) Notice: Subject to any disclaimer, the term of this patent is extended or adjusted under 35 U.S.C. 154(b) by 106 days.

(21) Appl. No.: 15/575,202

(22) PCT Filed: May 16, 2016

(86) PCT No.: PCT/IB2016/052826
§ 371 (c)(1),
(2) Date: Nov. 17, 2017

(87) PCT Pub. No.: WO2016/185360
PCT Pub. Date: Nov. 24, 2016

(65) Prior Publication Data
US 2018/0151003 A1 May 31, 2018

(30) Foreign Application Priority Data
May 19, 2015 (ZA) .................................. 2015/03489

(51) Int. Cl.
*G07C 5/00* (2006.01)
*G07C 5/08* (2006.01)
(Continued)

(52) U.S. Cl.
CPC ......... *G07C 5/008* (2013.01); *G05B 23/0216* (2013.01); *G06F 11/2294* (2013.01);
(Continued)

(58) Field of Classification Search
None
See application file for complete search history.

(56) References Cited

U.S. PATENT DOCUMENTS 6,799,106 B2    9/2004  Fukushima et al.
2005/0038581 A1 2/2005  Kapolka et al.
(Continued)

OTHER PUBLICATIONS

International Search Report and Written Opinion dated Jun. 16, 2016, issued in corresponding International Patent Application No. PCT/IB2016/052826. (12 pages).

(Continued)

*Primary Examiner* — Kimberly S Berona
*Assistant Examiner* — Abdhesh K Jha
(74) *Attorney, Agent, or Firm* — Fitch, Even, Tabin & Flannery LLP

(57) ABSTRACT

Systems and methods for transferring diagnostic commands to an on-board diagnostics (OBD) system of a vehicle are provided. A diagnostic interface device has a dedicated connection to a vehicle OBD system, and is in data communication with a diagnostic server over an open network. An instruction indicator is transmitted from the diagnostic interface device to the diagnostic server, and the diagnostic server transmits several instructions to be provided to the OBD system to execute the instruction to the diagnostic interface device. The instructions are provided in a batch which includes timing parameters specific to each instruction in the batch, so that the diagnostic interface device is capable of transferring each instruction in the batch to the vehicle OBD system in accordance with the timing parameters.

18 Claims, 11 Drawing Sheets

(51) Int. Cl.
*G06F 16/903* (2019.01)
*G05B 23/02* (2006.01)
*G06F 11/22* (2006.01)
*H04W 4/44* (2018.01)

(52) U.S. Cl.
CPC ......... *G06F 16/90335* (2019.01); *G07C 5/08* (2013.01); *H04W 4/44* (2018.02); *G07C 2205/02* (2013.01)

(56) References Cited

U.S. PATENT DOCUMENTS

| | | |
|---|---|---|
| 2010/0332073 A1 | 12/2010 | Mathieson et al. |
| 2013/0246135 A1 | 9/2013 | Wang |
| 2013/0317693 A1 | 11/2013 | Jefferies et al. |
| 2015/0121275 A1 | 4/2015 | Marshall et al. |

OTHER PUBLICATIONS

EPO; Application No. 16795981.6-1009; Supplementary European Search Report dated May 18, 2018.

SYSTEM AND METHOD FOR TRANSFERRING DIAGNOSTIC COMMANDS TO A VEHICLE

CROSS-REFERENCE TO RELATED APPLICATIONS

This application is a U.S. National Phase Patent Application of International Patent Application Number PCT/IB2016/052826, filed on May 16, 2016, which claims priority from South African provisional patent application number 2015/03489 filed on 19 May 2015, which is incorporated by reference herein.

FIELD OF THE INVENTION

The invention relates to a system and method for transferring diagnostic commands to an on-board vehicle diagnostics system, especially over a high-latency network.

BACKGROUND TO THE INVENTION

On-board diagnostics (OBD) refers to self-diagnostic and reporting capabilities of a vehicle. OBD systems include at least one engine control unit (ECU) in communication with a multitude of vehicle systems and subsystems. The OBD system provides a user with access to a status of the vehicle systems and subsystems, and may be used to read error codes of the various systems as well as to control or test the various systems and subsystems.

In order to access information of a vehicle's OBD system, a diagnostics tool connects to an OBD system of a vehicle, typically via a diagnostic connector port. The diagnostics tool can then communicate with the vehicle's OBD system, and read information associated with the various vehicle systems and subsystems. A diagnostics tool may also be operable to send instructions to the ECU of the vehicle which may route those instructions to actuators and sensors controlled by the ECU.

Diagnostics tools which can send instructions to an ECU are generally located in a vehicle workshop, as they are typically bulky and connected to a computer system that stores the commands locally and can generate the necessary commands according to the applicable communication protocol. Communication typically occurs as part of a communication session. Due to the relatively short-range communication used in such workshops, the communication protocol used to communicate with ECU's is particularly suitable for low latency communication. Delays in communications may result in time-outs as the system may assume that a connection has been lost. Existing systems are therefore not suitable for use over a high latency network, as the high latency network may result in delays that exceed applicable time-outs.

Attempts have been made to provide diagnostic tools which communicate with remote servers over open communication networks such as the Internet. However, unless the remote network has a minimal latency, for example 10 milliseconds, timeout errors will likely result. Low latency may be difficult to achieve over networks such as the internet, particularly where a communicating server is located a long way from a vehicle to be monitored.

The preceding discussion of the background to the invention is intended only to facilitate an understanding of the present invention. It should be appreciated that the discussion is not an acknowledgment or admission that any of the material referred to was part of the common general knowledge in the art as at the priority date of the application.

SUMMARY OF THE INVENTION

In accordance with the invention there is provided a method for transferring diagnostic commands to an on-board diagnostics (OBD) system of a vehicle, the method performed at a diagnostic server which is in data communication with a diagnostic interface device over an open network, the diagnostic interface device being connected to the vehicle OBD system by means of a dedicated connection, the method comprising:

receiving, from the diagnostic interface device, details of an electronic control unit (ECU) associated with the OBD system;

retrieving a list of functions executable by the ECU from a database, transmitting, to the diagnostic interface device, the list of functions executable by the ECU;

receiving, from the diagnostic interface device, an indication of a function selected from the list of executable functions; and transmitting a batch of instructions to the diagnostic interface device for performing the selected function, the batch of instructions including timing parameters specific to each instruction within the batch, so that the diagnostic interface device is capable of transferring each instruction in the batch to the vehicle OBD system over the dedicated connection in accordance with the timing parameters.

A further feature provides for the method to include the step of transmitting a further batch of instructions to the diagnostic interface device, the further batch of instructions including a configuration file instruction for facilitating readying of the timing parameters for the function.

Still further features provide for the method to include the step of transmitting an initial batch of instructions to the diagnostic interface device, the initial batch of instructions including a request for ECU parameters; for the method to include the step of receiving the requested ECU parameters; and for the method to include analysing the ECU parameters to confirm that they allow for the function to be performed before transmitting the batch of instructions for performing the selected function.

A yet further feature provides for the batch of instructions to include an instruction to keep a communication session alive.

Further features provide for the method to include the steps of: responsive to receiving a user termination action indicator, transmitting instructions to facilitate termination of the function to the diagnostic interface device; responsive to a predetermined waiting time expiring before a user termination action is performed, transmitting further instructions to the diagnostic interface device; responsive to receiving an error code from the diagnostic interface device, transmitting an error message to the diagnostic interface device; and, responsive to receiving a function completed indicator, transmitting a function completed message to the diagnostic interface device.

Yet further features provide for the timing parameters to include one or more of: time required to execute the function, timing limitations of a communication protocol used by the OBD system, and inter-byte and inter-packet gaps.

Further features provide for the instructions to include a collection of commands to initiate a diagnostic session, to perform the specific function, to wait for a certain time unless a user termination action has been performed, and an instruction to repeat a subset of the current batch a predetermined number of times.

A further feature provides for the method to include the step of, responsive to the subset of a batch having been performed the predetermined number of times, transmitting commands to facilitate termination of the function to the diagnostic interface device.

Still further features provide for batching and transmitting commands to facilitate termination of the function to include instructions to terminate a current function, to read any error codes, and to stop the communications session.

A yet further feature provides for the predetermined waiting time to include latency of the network to account for a delay as a result of transmission of the data.

Further features provide for the list of functions executable by the ECU to be transmitted in a format suitable for display on a display associated with the diagnostic interface device; and for batched instructions transmitted to the diagnostic interface device to include details to be displayed on the display. The details may include any one or more of further functions or interactive buttons that may be selected, progress or a status of the function, information about the current function, and the like.

The invention extends to a system for transferring diagnostic commands to an on-board diagnostics (OBD) system of a vehicle comprising a diagnostic server in data communication with a diagnostic interface device over an open network, the diagnostic interface device connected to the vehicle OBD system by means of a dedicated connection, the diagnostic server including:

an electronic control unit (ECU) detail receiving component for receiving details of an ECU from the diagnostic interface device;

an ECU function retrieving component for retrieving a list of functions executable by the ECU from a database;

a list transmitting component for transmitting the list of functions to the diagnostic interface device;

a function receiving component for receiving an indication of a function selected from the list of executable functions;

a batching component for batching instructions to be transmitted to the diagnostic interface device; and an instruction transmitting component for transmitting a batch of instructions to the diagnostic interface device for performing the selected function, the batch of instructions including timing parameters specific to each instruction in the batch.

Further features provide for the diagnostic server to include a configuration file instruction transmission component for transmitting a configuration file instruction to the diagnostic interface device, the configuration file facilitating readying of timing parameters for the function.

Still further features provide for the diagnostic server to include an ECU parameter request transmitting component for transmitting a request for ECU parameters; an ECU parameter receiving component for receiving ECU parameters; and an ECU parameter analysing component configured to analyse the ECU parameters and determine if they allow the selected function to be performed.

Yet further features provide for the diagnostic server to include a communication session component configured to include an instruction to keep a communication session alive as part of a batch of instructions.

Further features provide for the diagnostic server to include a user termination action receiving component for receiving a user termination action; a termination instruction transmitting component for transmitting a termination instruction to the diagnostic interface device; a waiting time component for determining when a waiting time has expired without a user termination action having been received; an error code receiving component for receiving an error code from the diagnostic interface device; and an error code message transmitting component for transmitting an error code message to the diagnostic interface device.

A further feature provides for the diagnostic server to include a command counting component for counting the number of times that a subset of a batch is performed and configured to detect when the subset has been performed a predetermined number of times and to instruct the termination instruction transmitting component to transmit a termination instruction to the diagnostic interface device upon detecting such performance.

Still further features provide for the diagnostic server to include a display component for transmitting instructions to display information or interactive buttons on a display associated with the diagnostic interface device as part of the batched instructions.

The invention extends to a method for transferring diagnostic commands to an on-board diagnostics (OBD) system of a vehicle, the method performed at a diagnostic interface device connected to the OBD system via a dedicated connection and in data communication with a diagnostic server over an open network, the method including the steps of:

transmitting, to the diagnostic server, details of an ECU associated with the OBD system;

receiving, from the diagnostic server, a list of functions executable by the ECU;

receiving, from a user, an indication of a function in the list to be provided to the OBD;

transmitting, to the diagnostic server, the indication of the function;

receiving a batch of instructions from the diagnostic server for performing the selected function, the batch of instructions including timing parameters specific to each instruction within the batch; and transferring each instruction in the batch to the OBD system in accordance with the timing parameters.

Further features provide for the method to include the step of receiving a configuration file instruction from the diagnostic server, the configuration file facilitating readying of timing parameters for the instruction; and loading the configuration file into a memory.

Still further features provide for the method to include the steps of: receiving, from the diagnostic server, an initial batch of instructions, the initial batch including a request for ECU parameters; transmitting a request for ECU parameters to the OBD system; receiving ECU parameters from the OBD system; and transmitting the ECU parameters to the diagnostic server in a batched format.

A yet further feature provides for the batch of instructions to include an instruction to keep the communication session alive.

Further features provide for the method to include the steps of: responsive to receiving a user termination action, transmitting a user termination indicator to the diagnostic server; responsive to receiving an error code from the OBD system, transmitting the error code to the diagnostic server; and responsive to recognising that a function is completed, transmitting a function completed indicator to the diagnostic server.

Still further features provide for the method to include the steps of, responsive to receiving details to be displayed on a display associated with the diagnostic interface device as part of the batched instructions, displaying the details on the display, and for the list of functions executable by the ECU to be in a format suitable for display on the display.

Yet further features provide for the method to include the steps of:
  in response to the OBD system responding to an instruction with a response that the instruction cannot be performed now, waiting a predetermined amount of time and repeating the specific instruction; and
  in respond to the OBD system responding to an instruction with a response that the instruction has been received but the OBD system cannot respond now, waiting a predetermined amount of time for the response.

The invention extends to a diagnostic interface device for transferring diagnostic commands to an on-board diagnostics (OBD) system of a vehicle comprising:
  a physical interface for communicating with the OBD system over a dedicated network;
  a communication interface for communicating with a diagnostic server over an open network; and
    a processing module, wherein the processing module includes:
  a list receiving component for receiving a list of functions from the diagnostic server;
  a user input component for receiving, from a user, an indication of a function in the list to be provided to the OBD system;
  a function transmitting component for transmitting an indication of the function to the server;
  an instruction receiving component for receiving a batch of instructions from the diagnostic server, the batch of instructions including timing parameters specific to each instruction within the batch; and
  an OBD system transferring component for transferring each instruction in the batch to the OBD system in accordance with the timing parameters.

Further features provide for the diagnostic interface device to include a configuration file receiving component for receiving a configuration file from the diagnostic server; and a configuration file loading component for loading the configuration file into a memory.

A still further feature provides for the diagnostic interface device to include a batching component for batching instructions to be transmitted to the diagnostic server.

Yet further features provide for the diagnostic interface device to include an ECU parameter request receiving component for receiving an ECU parameter request; an ECU parameter request transmitting component for requesting, from the OBD system, ECU parameters; an ECU parameter receiving component for receiving ECU parameters from the OBD system; and an ECU parameter transmitting component for transmitting the ECU parameters to the diagnostic server in a batched format.

A further feature provide for the diagnostic interface device to include a communications session component for keeping the communications session alive.

Still further features provide for the diagnostic interface device to include a user termination action receiving component for receiving a user termination action from a user interface; a user termination action transmitting component for transmitting the user termination action to the diagnostic server; an error code receiving component for receiving an error code from the OBD system; an error code transmitting component for transmitting an error code to the diagnostic server; and a function completed transmitting component for transmitting a function completed indicator to the diagnostic server.

Yet further features provide for the diagnostic interface device to include a display component for transmitting instructions to display information or interactive buttons on a display associated with the diagnostic interface device.

The diagnostic interface device may be a diagnostic device in communication with a vehicle's OBD system. The diagnostic device may be plugged into a complementary diagnostic connection port to communicate with the OBD system. The diagnostic device may be connected to a user device over a wireless communication network such as Wi-Fi or Bluetooth, or via a wired connection. The diagnostic device may include a web server which allows the user device to browse to the web server to allow a user to provide user input and interact with the diagnostic connector via the user interface of the user device. The user interface of the user device may be the display associated with the diagnostic interface device.

The user device may provide internet connectivity to the diagnostic device and allow it to communicate with the diagnostic server. Additionally, the mobile communication device may allow a user to interact with limited functions available on the diagnostic connector when the diagnostic device is not in data communication with the diagnostic server.

In one embodiment, a user device may be the diagnostic interface device and may include a diagnostic connector port configured to be inserted directly into a vehicle's diagnostic connection port or may connect wirelessly to the vehicle's OBD system. In a still further embodiment, the diagnostic interface device may form part of a vehicle's OBD system.

The invention extends to a computer program product for transferring diagnostic commands to an on-board diagnostics (OBD) system of a vehicle, the computer program product comprising a non-transitory computer-readable medium having stored computer-readable program code, the computer-readable program code executable by a processing circuit to perform the steps of:
  transmitting, to a diagnostic server, details of an electronic control unit (ECU) associated with the OBD system;
  receiving, from the diagnostic server, a list of functions executable by the ECU;
  receiving, from a user, an indication of a function in the list to be provided to the OBD;
  transmitting, to the diagnostic server, the indication of the function;
  receiving a batch of instructions from the diagnostic server for performing the selected function, the batch of instructions including timing parameters specific to each instruction within the batch; and
  transferring each instruction in the batch to the OBD system in accordance with the timing parameters.

An embodiment of the invention will now be described, by way of example only, with reference to the accompanying drawings.

DETAILED DESCRIPTION WITH REFERENCE TO THE DRAWINGS

Embodiments described herein provide a system and method for transferring diagnostic commands to an on-board diagnostics (OBD) system of a vehicle.

In a conventional diagnostic command system, a low-latency network is required to allow successful transmission of commands to the OBD system, as existing vehicle OBD systems were developed for communication with diagnostic tools physically located at a place where a vehicle is serviced. The latency of data transfer may not have been a particular consideration in developing standard communication protocols, as the relatively short-range communications allowed for low latency communication. The present invention enables commands to be transmitted over a relatively high-latency open communications network, such as the Internet, while limiting timeouts and at least partially preventing unexpected communication session termination.

Figure 1:
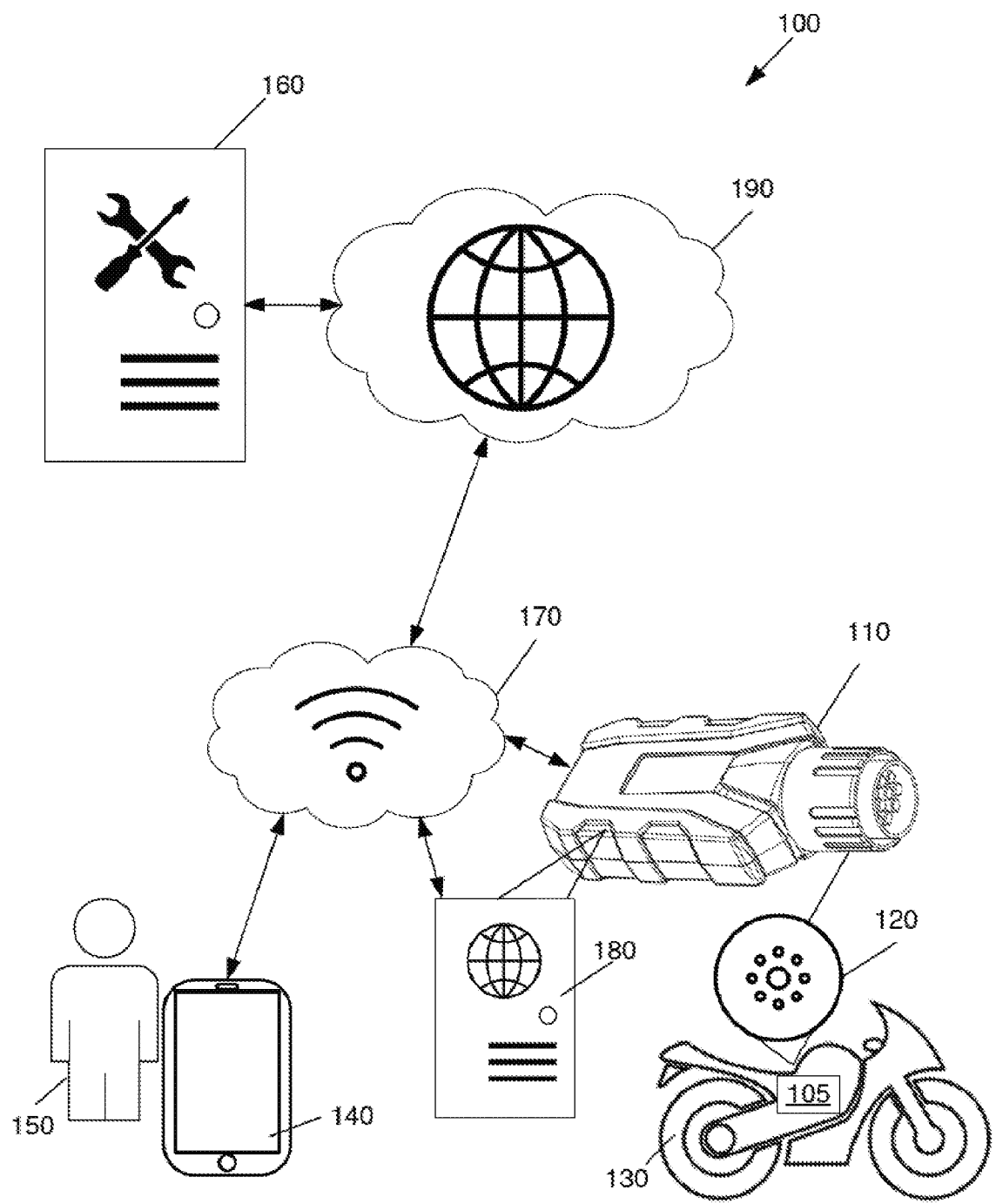
FIG. 1 shows a system for transferring diagnostic commands to an on-board diagnostics (OBD) system of a vehicle according to an exemplary embodiment of the invention.

FIG. 1 shows an exemplary embodiment of a system (100) for the transfer of diagnostic commands to an on-board diagnostics (OBD) system (105) of a vehicle. The system includes a diagnostic interface device (110) which is plugged into a diagnostic connection port (120) of a vehicle (130) to be serviced, tested or adjusted. The diagnostic interface device is provided in a rugged shock-resistant casing and, in this embodiment, obtains power from the vehicle (130) via the diagnostic connection port (120). In the present embodiment, the vehicle (130) is a motorbike. However, it will be appreciated that any vehicle with an OBD system may be employed, including, but not limited to, a motor vehicle, a truck, a boat, an aircraft and the like.

It will be appreciated that by being plugged into the diagnostic connection port (120) of the vehicle (130), the diagnostic interface device is connected to the vehicle OBD system by means of a dedicated connection, in this case a physical connection. In this specification the term "dedicated connection" refers to any non-public connection that may be established between two electronic devices, including physical wired connections, private local area networks (LANs), Bluetooth® connections, private Wi-Fi networks, infra-red, or near-field communication to name a few examples. A dedicated connection is a connection over which a user may exercise at least some form of control. Parameters of the network, particularly latency and speed, are typically known and stable.

The system includes a user device (140) which is associated with a user (150). The user device (140) may be any portable user device such as a mobile phone, tablet computer, laptop computer, or the like. The user device (140) and the diagnostic interface device (110) are in data communication with each other, in this illustration by means of a Wi-Fi network (170), but which could also be by means of other networks such as a cellular data network. The user device (140) and the diagnostic interface device (110) could also be connected by means of a wired connection in which case the diagnostic interface device (110) is provided with a communications port (not shown) such as a Universal Serial Bus (USB) port. In that case, the diagnostic interface device (110) could obtain power from the user device (140) rather than from the vehicle (130).

The diagnostic interface device (110) hosts a web server (180) which allows the user device (140) to browse thereto and to communicate with the diagnostic interface device (110) over the Wi-Fi network. The Wi-Fi network (170) also allows devices connected thereto (such as the diagnostic interface device (110) to access an open network, in this example the Internet (190). An open network is a network over which a user has minimal or no control. Parameters of the network are typically not known or under the control of the user, for example speed and latency of a connection over the network. A multitude of users in a variety of locations may be connected to the open network. The Internet is an example of such an open network. The diagnostic interface device (110) is in communication with a remote diagnostic server (160) over the Internet (190). An open network allows the diagnostic server (160) to be located remote from the diagnostic interface device (110), such as in a different country.

The OBD system (105) includes an electronic control unit (ECU) which communicates with individual vehicle components, systems and subsystems in order to receive error codes, states, real-time parameters or the like. Additionally, the ECU may instruct the various vehicle components to perform certain functions. More than one ECU may be provided on a vehicle, each ECU dedicated to a specific component or system of the vehicle. An anti-lock braking system (ABS) ECU, for example, may only be configured to manage data relative to the ABS system of a vehicle. The ECU's of various systems may be configured to communicate with a single ECU that is in data communication with the diagnostics port of the vehicle, or all ECU's may communicate via the same diagnostic port. It should be noted that a reference to an ECU of the OBD system (105) below may include one or more ECUs of the OBD system (105).

Figure 2:
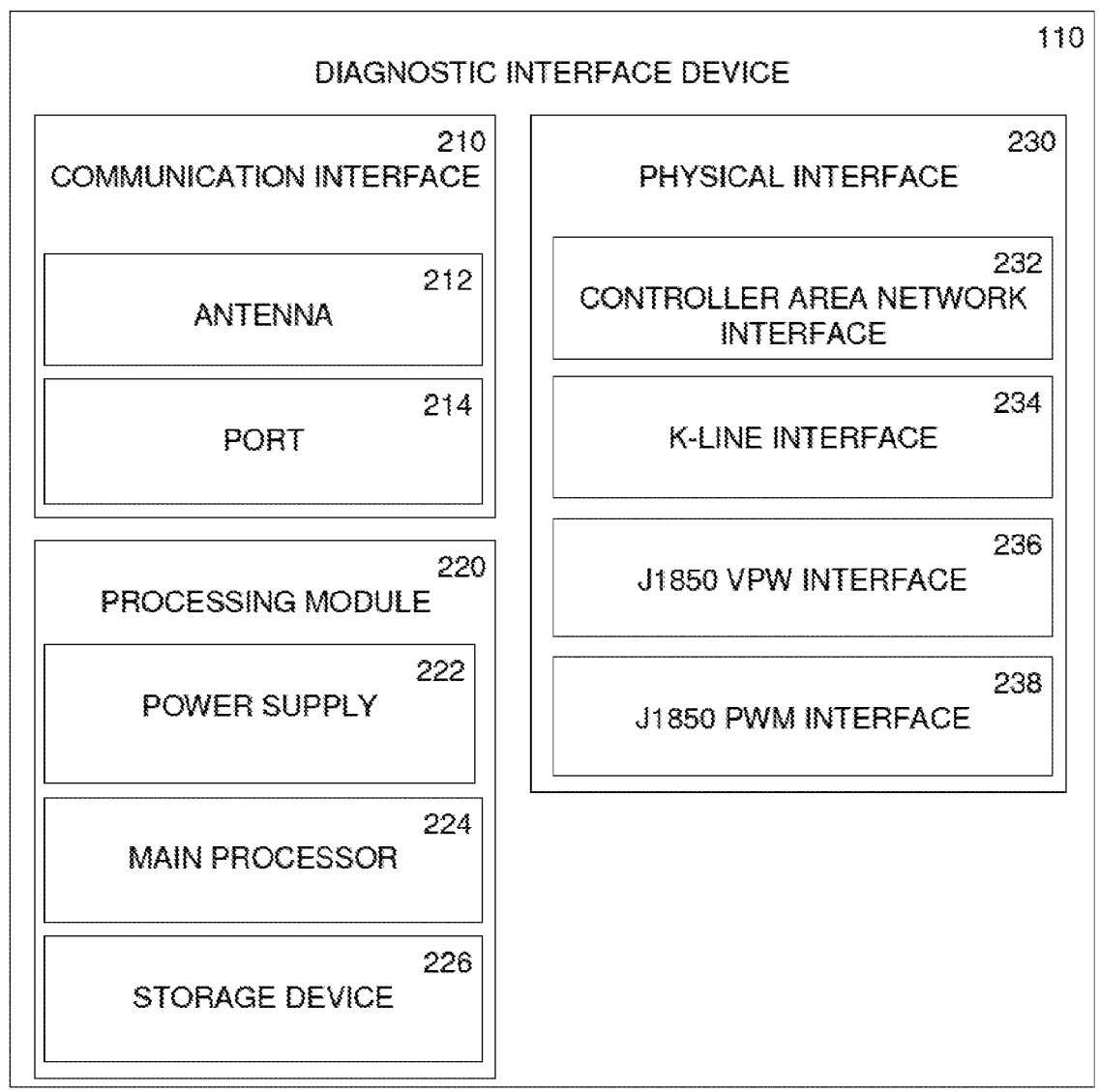
FIG. 2 is a block diagram illustrating physical components of an embodiment of a diagnostic interface device suitable for connecting to a vehicle diagnostic connection port.

Physical components of an exemplary embodiment of the diagnostic interface device (110) are shown in FIG. 2. The diagnostic interface device (110) includes a communication interface (210), a processing module (220), and a physical interface (230).

The communication interface (210) allows the device (110) to communicate with the diagnostic server (160) and, optionally, the user device (140). The communication interface (210) includes an antenna (212) for allowing wireless communication over, for example, a Wi-Fi or Bluetooth network, and a port (214) for communicating over a wired connection, for example a USB connection.

The processing module (220) allows instructions to be carried out by the diagnostic interface device (110). The processing module (220) includes a power supply (222) for providing the diagnostic interface device (110) with power, a main processor (224) for processing data, and a storage device (226) for storing data required for operation of the diagnostic interface device (110). In the present embodiment, the main processor (224) is implemented on an advanced reduced instruction set computing machine (ARM) processor.

The physical interface (230) allows the diagnostic interface device (110) to connect to the on-board diagnostic (OBD) system (105) of the vehicle (130), typically via the diagnostic connection port (120). Various communication protocols may be usable by different types of vehicles. Accordingly, a variety of protocols may be provided by the physical interface component (230). The physical interface component may include a controller area network (CAN) interface (232) for allowing communication over a CAN bus communication protocol, a K-line interface (234) for allowing communication with a vehicle using an International Standard Organization (ISO) 9141 K-Line communication protocol, a J1850 Variable Pulse Width (VPW) interface (236) for allowing communication over a Society of Automotive Engineers (SAE) J1850 VPW communication protocol, and a J1850 Pulse Width Modulation (PWM) interface (238) for allowing communication over a SAE J1850 PWM communication protocol.

The diagnostic interface device (110) includes functionality to allow a user to perform basic diagnostic functions with the OBD system. This may include reading fault codes, clearing fault codes, reading real-time values, reading ECU information, and controlling the flow of instructions. The diagnostic interface device may therefore be used to perform these basic diagnostic functions without the need to receive information from an outside source. Importantly, however, the diagnostic device does not include functionality for performing more advanced analysis or actions, as will be appreciated from what follows.

Figure 3:
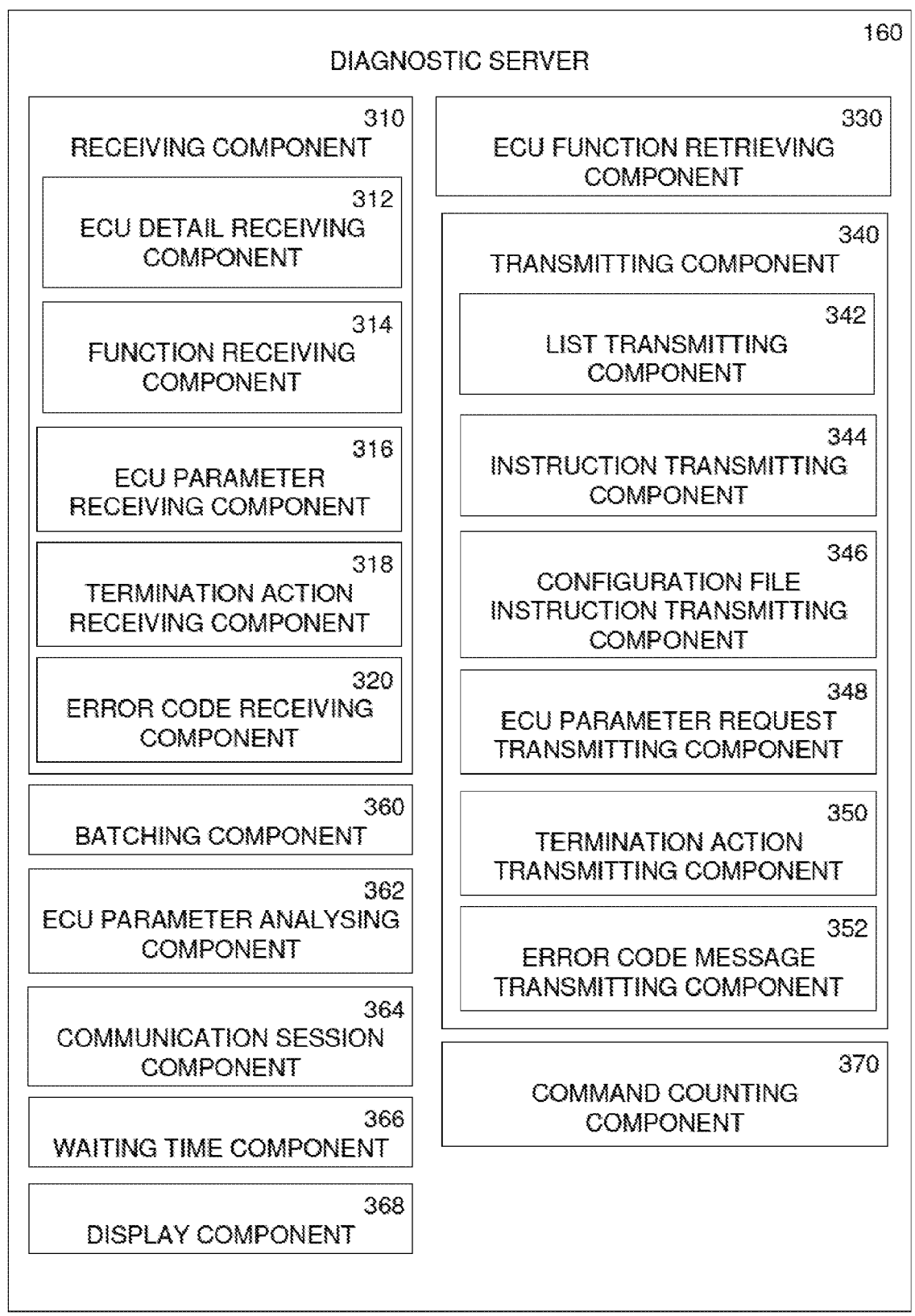
FIG. 3 is a block diagram illustrating logical components of an embodiment of a diagnostic server.

Logical components of an exemplary embodiment of the diagnostic server (160) is shown in FIG. 3. The diagnostic server (160) may include a processor for executing the functions of components described below, which may be provided by hardware or by software units executing on the diagnostic server (160). The software units may be stored in a memory component and instructions may be provided to the processor to carry out the functionality of the described components. Some or all of the components may be provided by a software application downloadable onto and executable on the diagnostic server (160).

The diagnostic server (160) includes a receiving component (310), an ECU function retrieving component (330), a transmitting component (340), a batching component (360), an ECU parameter analysing component (362), a communication session component (364), a waiting time component (366), a display component (368), and a command counting component (370).

The ECU function retrieving component (330) is configured to retrieve ECU parameters executable by a specific ECU from a database associated with the diagnostic server. The batching component (360) is configured to batch instructions to be provided to the OBD system. The ECU parameter analysing component (362) is configured to analyse ECU parameters received from the OBD system, and to check whether a desired function may be performed with those ECU parameters. The communication session component (364) is configured to keep a communication session alive. The waiting time component (366) is configured to determine when a waiting time has expired before subsequent instructions may be sent to the diagnostic interface device. The display component (368) is configured to generate instructions to be sent to a display associated with the diagnostic interface device as part of batched instructions, and the command counting component (370) is configured to count executed commands to determine when a predetermined number of executions of a subset of a batch of instructions has been reached.

The receiving component (310) includes various subcomponents to receive data from the diagnostic interface device and the OBD system. An ECU detail receiving component (312) is configured to receive ECU details from the diagnostic interface device. A function receiving component (314) is configured to receive an indication of a function received from the diagnostic interface device. An ECU parameter receiving component (316) is configured to receive ECU parameters from the OBD system. A termination action receiving component (318) is configured to receive a termination action from the diagnostic interface device, and an error code receiving component (320) is configured to receive an error code from the diagnostic interface device.

The transmitting component (340) includes various subcomponents to transmit data to the diagnostic interface device and the OBD system. A list transmitting component (342) is configured to transmit a list of functions available for an applicable ECU to the diagnostic interface device. An instruction transmitting component (344) is configured to transmit batched instructions to the diagnostic interface device. A configuration file instruction transmitting component (346) is configured to transmit a configuration file instruction to the diagnostic interface device. An ECU parameter request transmitting component (348) is configured to transmit a request for ECU parameters to the OBD system. A termination action transmission component (350) is configured to transmit a termination action to the diagnostic interface device, and an error code message transmitting component (352) is configured to transmit an error code message to the diagnostic interface device.

Figure 4:
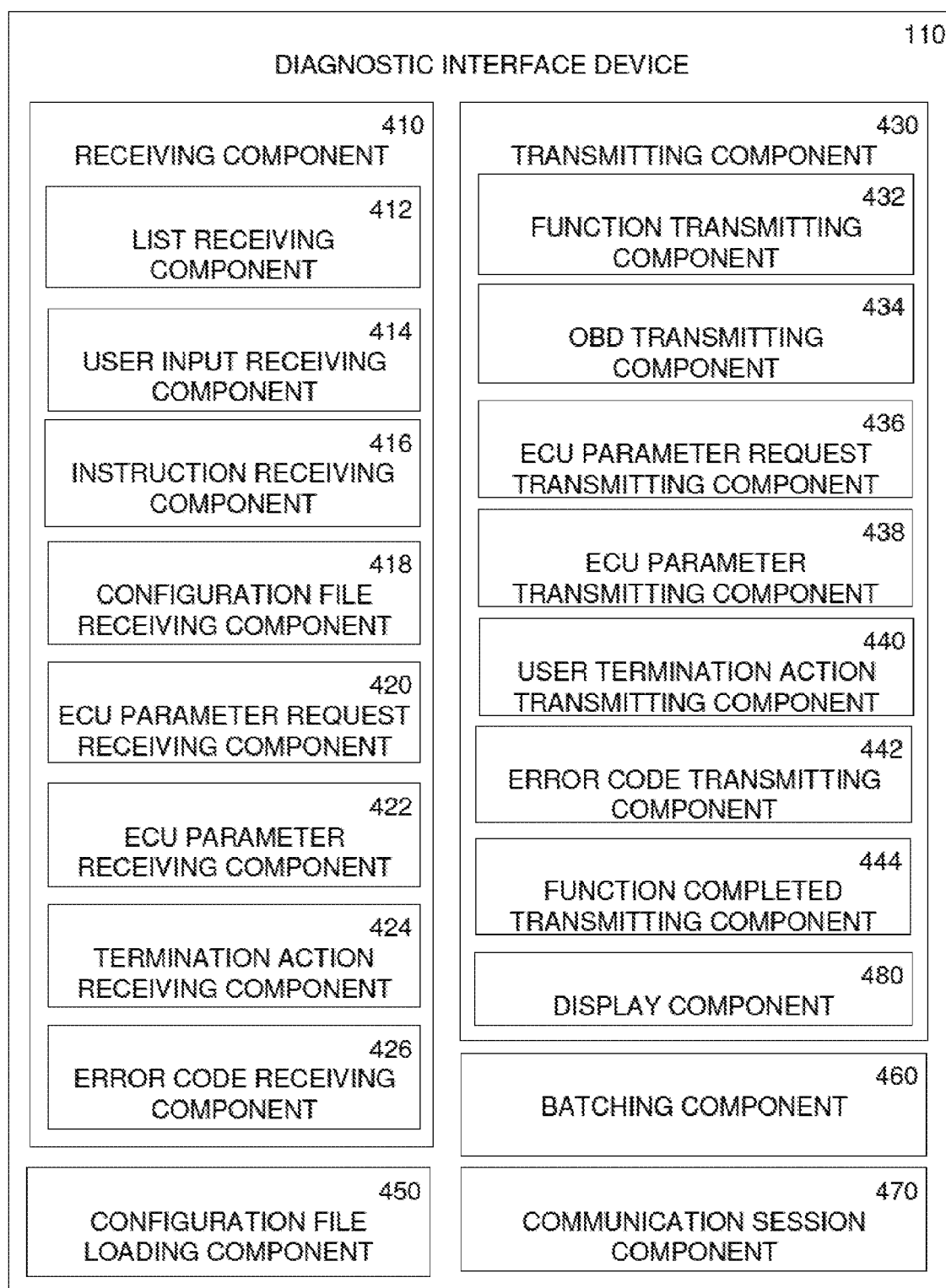
FIG. 4 is a block diagram illustrating logical components of an embodiment of a diagnostic interface device.

Logical components of an exemplary embodiment of the diagnostic interface device (110) is shown in FIG. 4. The diagnostic interface device (110) includes a receiving component (410), a transmitting component (430), a configuration file loading component (450), a batching component (460), and a communication session component (470).

The configuration file loading component (450) is configured to load a configuration file into memory. The configuration file readies timing parameters by setting it up for the relevant communication protocol. The batching component (460) is configured to batch data to be transmitted to the diagnostic server (160). The communication session component (470) is configured to keep a communication session alive and control the flow of instructions.

The receiving component (410) includes various subcomponents to receive data from the diagnostic server (160) and the OBD system. A list receiving component (412) is configured to receive a list of functions executable by a relevant ECU from the diagnostic server (160). A user input receiving component (414) is configured to receive user input indicating which of the executable functions is to be provided to the OBD system. An instruction receiving component (416) is configured to receive batched instructions, including timing parameters, from the diagnostic server (160). A configuration file receiving component (418) is configured to receive an indication of a configuration file from the diagnostic server (160). An ECU parameter request receiving component (420) is configured to receive a request for ECU parameters from the diagnostic server (160), while an ECU parameter receiving component (422) is configured to receive ECU parameters from the OBD system. A termination action receiving component (424) is configured to receive a termination action from a user, and an error code receiving component (426) is configured to receive an error code form the OBD system.

The transmitting component (430) includes various sub-components to transmit data to the diagnostic server (160), the OBD system and the user device (140). A function transmitting component (432) is configured to transmit an indication of a function selected by a user to the diagnostic server (160). An OBD transmitting component (434) is configured to transmit every instruction received as part of a batch of instructions from the diagnostic server (160), to the OBD system. An ECU parameter request transmitting component (436) is configured to transmit a request for ECU parameters to the OBD system, while an ECU parameter transmitting component (438) is configured to transmit received ECU parameters to the diagnostic server (160).

A user termination action component (440) is configured to transmit a user termination action indicator to the diagnostic server (160), and an error code transmitting component (442) is configured to transmit an error code indicator to the diagnostic server (160). A function completed transmitting component (444) is configured to transmit a function completed indicator to the diagnostic server. A display component (480) is configured to transmit details to be displayed on a display of the user device (140).

Figure 5:
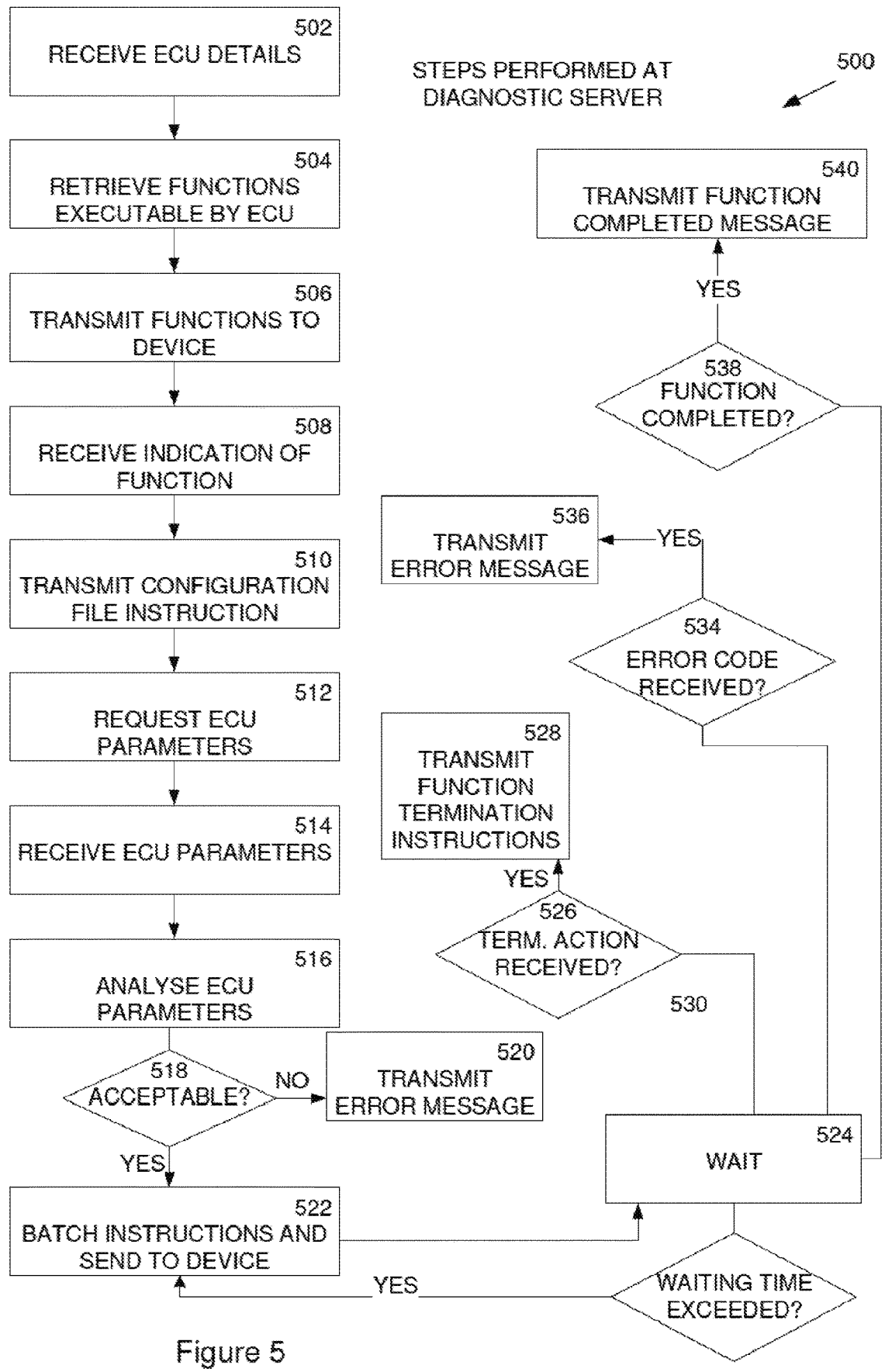
FIG. 5 is a flow diagram illustrating steps performed at a diagnostic server in a method of transferring diagnostic commands to a vehicle.
Figure 6:
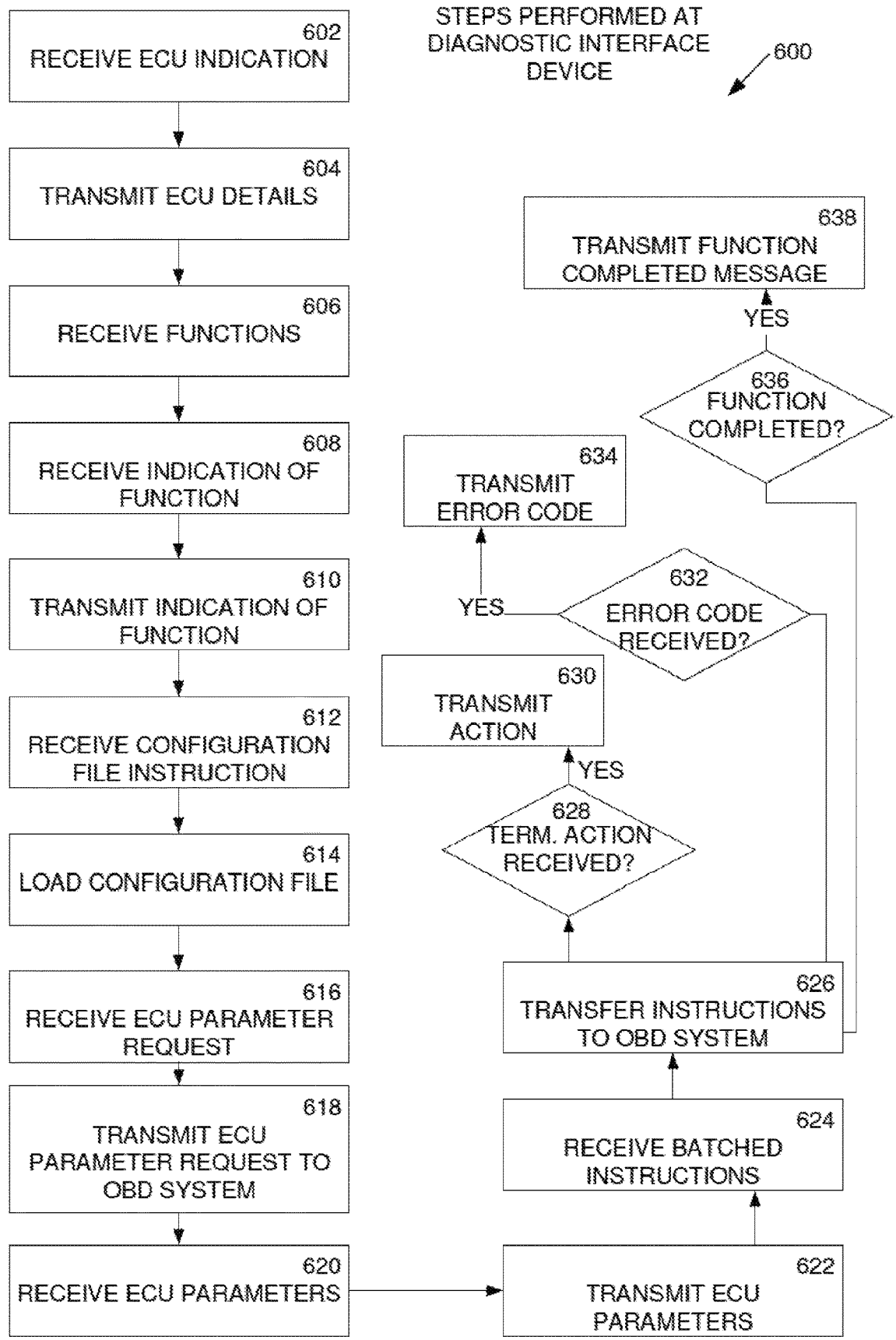
FIG. 6 is a flow diagram illustrating steps performed at a diagnostic interface device in a method of transferring diagnostic commands to a vehicle.

FIG. 5 shows a method (500) of transferring diagnostic commands to an on-board diagnostics (OBD) system of a vehicle using the diagnostic server (160) of FIG. 3, and FIG. 6 shows a method (600) of transferring diagnostic commands to an on-board diagnostics (OBD) system using the diagnostic interface device (110) of FIG. 4. FIGS. 7A to 7F shows screenshots taken from a display associated with the diagnostic interface device (110). In the present embodiment, the associated display is the display of the user device (140) in communication with the diagnostic interface device (110) via the web server (180). The methods (500, 600) as they are performed during testing of an engine coolant light of a vehicle is described below with reference to FIGS. 5, 6, and 7A to 7F.

In order to transfer diagnostic command to an OBD system of a vehicle according to an embodiment of the present invention, the system described with reference to FIG. 1 may be employed. In order to interact with the vehicle, the user must first identify the specific model of the vehicle that they would like to interact with.

Figure 7A:
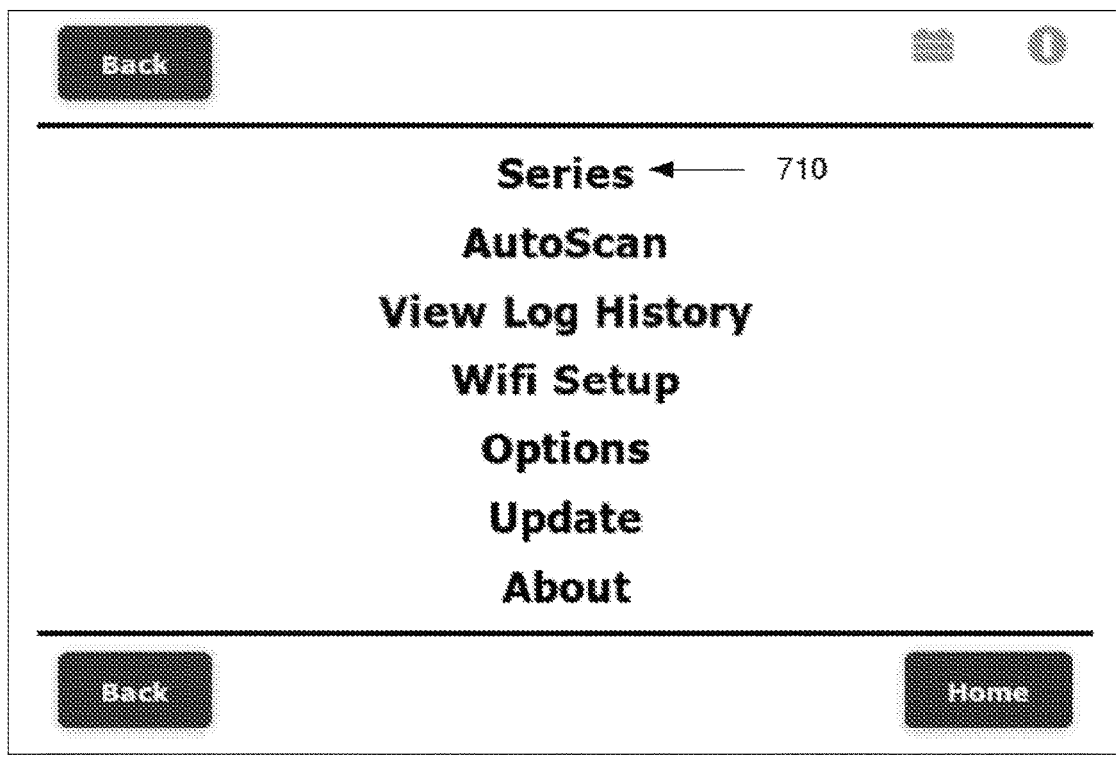
FIG. 7A to 7F are screen shots of a display on a user device during an exemplary method of transferring diagnostic commands.
Figure 7B:
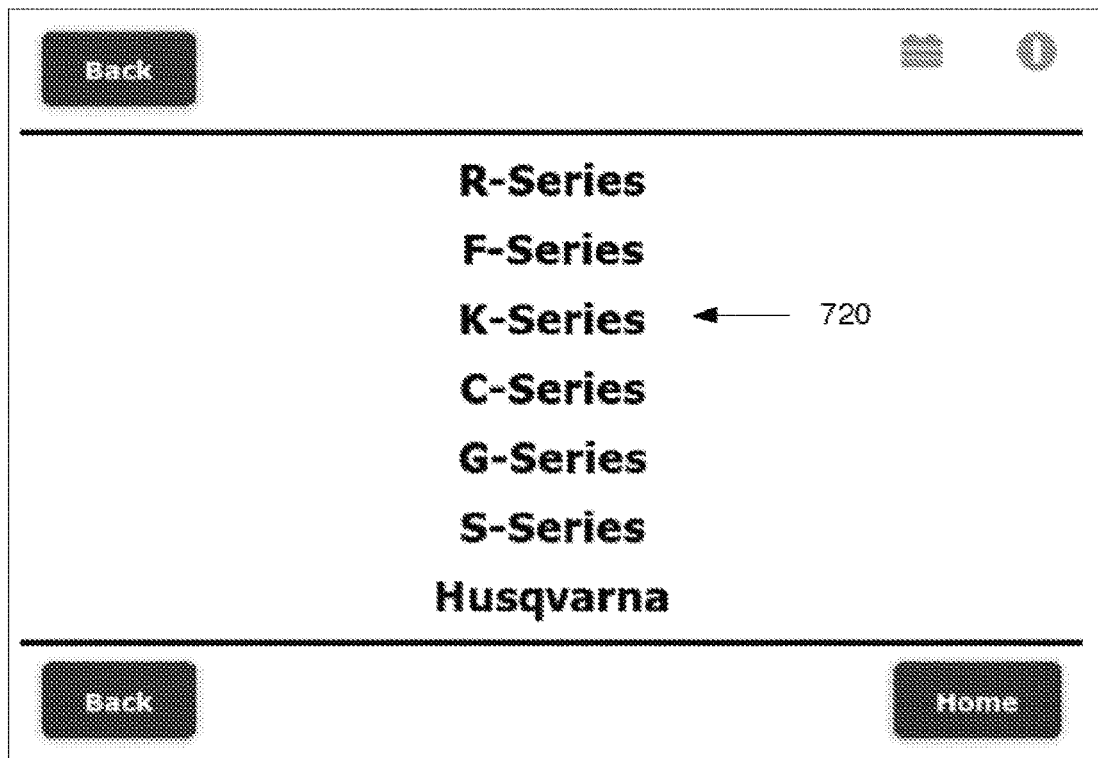
Figure 7D:
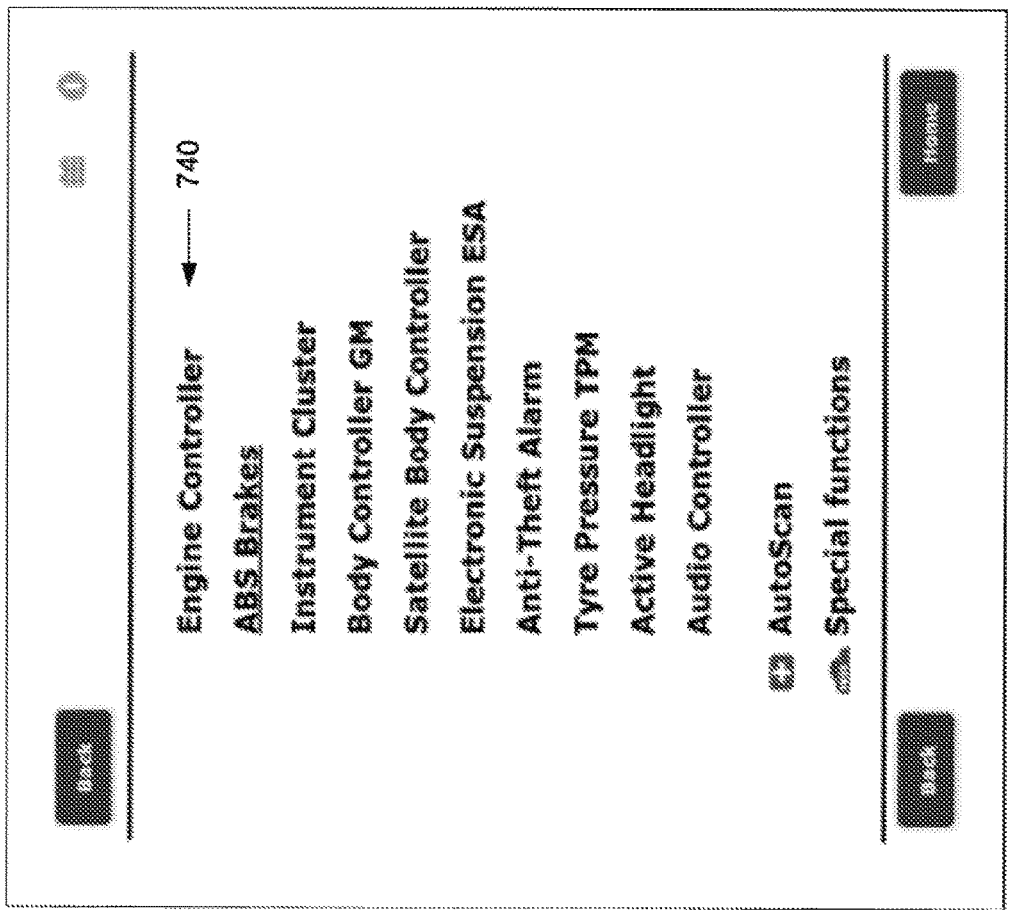
Figure 7C:
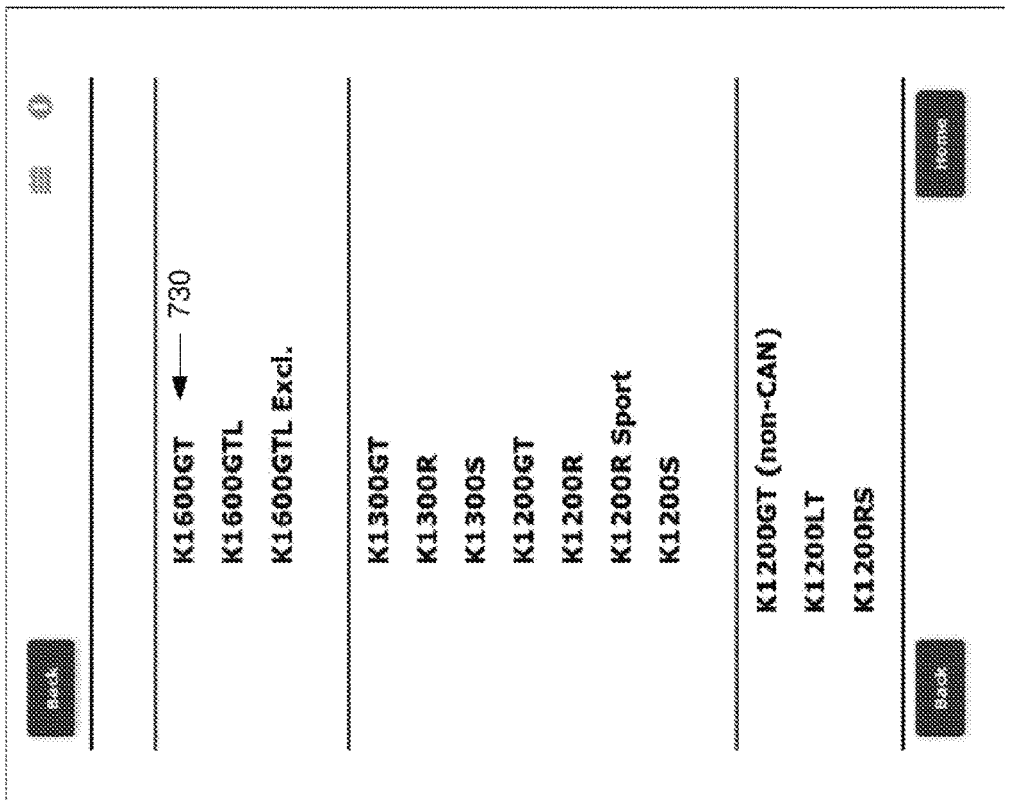

A user browses to the web server (180) of the diagnostic interface device (110) using their user device (140). FIG. 7A is then displayed in the display of the user device (140). When the user selects the "Series" (710) function on the display, FIG. 7B is displayed to the user. The user then selects "K-series" (720), and is presented with the display of FIG. 6C. Then, the user selects "K1600GT" (730), which is the model of the relevant vehicle, in this case a motorbike. The diagnostic interface device (110) receives (602) the indication of the relevant ECU, and FIG. 7D is then displayed to the user. The user selects "Engine Controller" (740), and is provided with the display in FIG. 7E. Upon selecting "Service functions" (750), the diagnostic interface device (110) transmits (604) the ECU details to the diagnostic server (160) over the Internet.

Figure 7F:
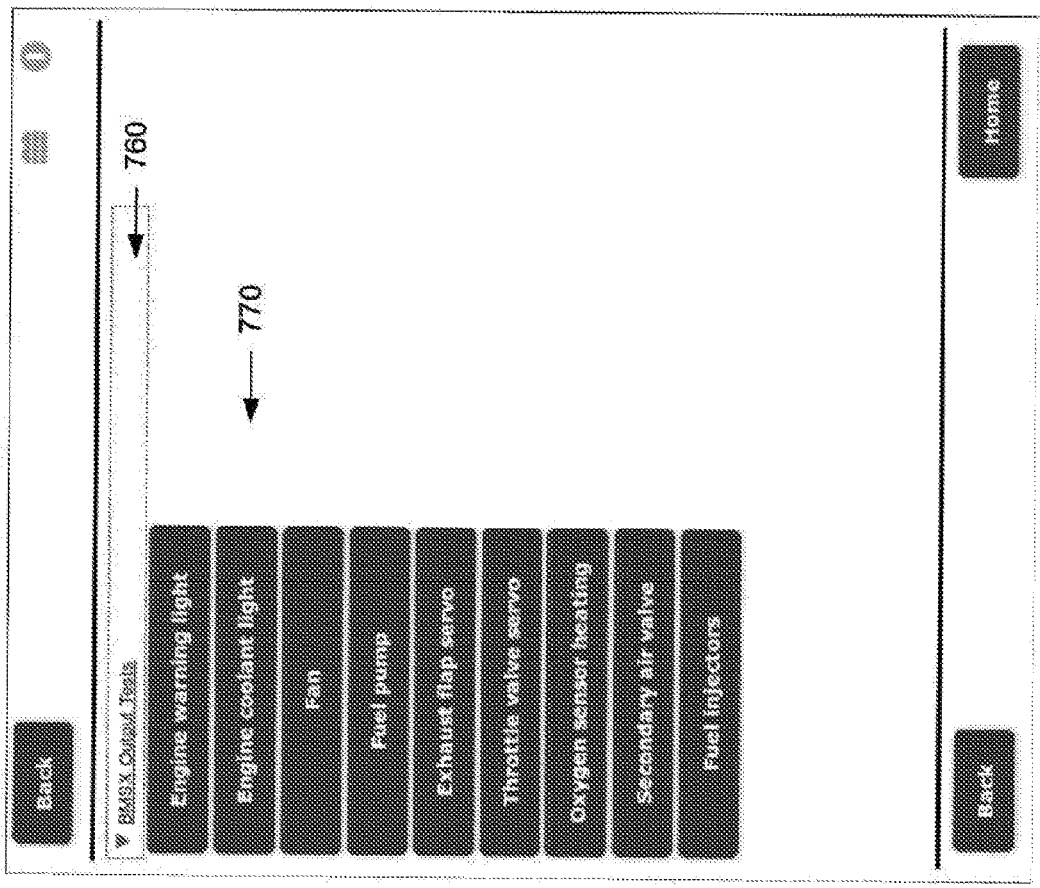
Figure 7E:
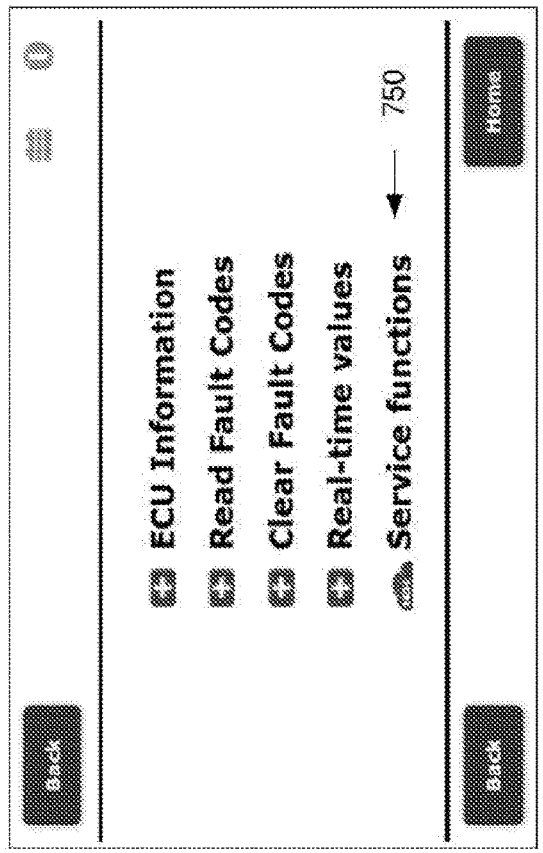

The diagnostic server (160) receives (502) the ECU details, and retrieves (504) a list of functions executable by the specific ECU from a database associated therewith. The diagnostic server (160) transmits this list of functions to the diagnostic interface device (110). The diagnostic interface device (110) receives (606) the list of functions, and sends them to the user device (140) to be displayed on the display of the user device as shown in FIG. 7F. The user may need to expand a subsection of the list, for example "BMSX Output Test" (760), so that a desired function in the list is displayed. In FIG. 7F, a user wishes to test an engine coolant light and therefore selects the desired function, "Engine Coolant Light" (770).

When the user selects the "Engine Coolant Light" function (770), the diagnostic interface device receives (608) an indication thereof, and transmits (610) an indication of this function to the diagnostic server (160).

The diagnostic server receives (508) the indication of the function. In response, the diagnostic server transmits (510) a configuration file instruction to the diagnostic interface device (110), which receives (612) the instruction. The diagnostic interface device (110) then loads (614) the configuration file into memory. This readies timing parameters by setting them up for the specific communication protocol in use.

The server transmits a batch of instructions to the diagnostic interface device (110), including a request (512) for ECU parameters associated with the specific function. Information to be displayed on the display associated with the diagnostic interface device (110) is also transmitted. A user option may also be provided to allow the user to select to continue with the method, or to cancel the method. If the user instructs the method to continue, it does so. Alternatively, if the user selects cancel, the method may immediately stop.

The diagnostic interface device (110) receives (616) the request for ECU parameters and transmits (618) a request for the parameters to the OBD system (105). The ECU parameters are then received (620) and transmitted (622) to the diagnostic server (160). These parameters are batched together and sent in a batched format to the diagnostic server (160).

The diagnostic server (160) receives (514), and analyses (516) the ECU parameters. The ECU parameters may vary depending on the type of function to be performed. Certain parameters may influence the possibility of executing a desired instruction. In the present example, the parameters are the revolutions per minute (RPM) of an engine of the vehicle, and any current fault codes of the OBD. Analyses of the ECU parameters includes determining that the RPM value is not zero, which means that the engine of the vehicle is running, and that any fault codes present are not relevant to the applicable function. The function may still be allowed to continue if fault codes are present that are not relevant to that function.

If the ECU parameter analysis determines (518) that the parameters are not acceptable, an error message is transmitted (520) to the diagnostic interface device, and the method is stopped. If the parameters are determined (518) to be acceptable, the method may continue.

The diagnostic server (160) batches a set of instructions to initiate a diagnostic session and execute the selected function, and transmits (522) the batch of instructions to the diagnostic interface device. The batch of instructions includes timing parameters specific to each instruction in the batch. The diagnostic server (160) then waits (524) for a certain time period. The time period may be included in the set of instructions, and be calculated to be sufficient for the set of instructions to be carried out by the diagnostic interface device (110), given network latency. The instructions may also include an instruction to repeat a subset of the batch of instructions a number of times.

In order to perform a desired function, certain instructions need to be provided to the OBD system (105) in a specific order and within specific timeframes. Some procedures cannot be interrupted whilst being performed. By grouping and batching instructions so that groups of instructions and their breakouts are provided by the diagnostic interface device to the OBD system at the correct times and in the correct order, the diagnostic interface device (110) has the required instructions ready to transmit when required. This may prevent timeouts which would otherwise have occurred if the instructions were sent directly from the server to the OBD system over the open network.

The diagnostic interface device (110) receives (624) the batched instructions, and transfers (626) the instructions according to the relevant timing parameters to the OBD system. The OBD system may then execute the instructions in the correct order and at the correct times.

In addition to executing the instructions in the correct order and at the correct times over the dedicated connection, the diagnostic interface device (110) is operable to control the flow of instructions based on responses received from the OBD system (105). Depending on other actions currently being carried out by the vehicle, the OBD system may respond to a request from the diagnostic interface device (110) with, "I cannot perform your request now, please try later", or "I received your request but cannot respond now, please wait for my response". In the first case, the diagnostic interface device is operable to control the flow of instructions so as to wait and repeat the specific instruction again. In the second case, the diagnostic interface device is operable to wait one or more additional time periods for the response.

The user (150) may be provided with a cancellation option on the display in order to terminate the function currently being executed. However, the exact procedure to terminate a function may not be straightforward. A series of instructions may be required to complete so as to safely disable a present function. If the user selects the cancellation option, the diagnostic interface device (110) receives (628) the user termination action, and transmits (630) a user termination instruction to the diagnostic server (160). If the diagnostic server (160) receives (526) such a termination instruction, it batches and transmits (528) the functions required to terminate the function to the diagnostic interface device. The termination functions may include a command to terminate the communication session, and an instruction to read any error codes. The batched set is handled in a similar manner to the batch including the original instruction, and are performed when provided to the OBD system by the diagnostic interface device. A message indicating that the function was terminated may be displayed on the display.

If the function requires a subsequent batch of instructions to be transmitted to the diagnostic interface device, the server may be configured to wait a certain amount of time before transferring the subsequent instructions. If the waiting time has been exceeded (530), the diagnostic server (160) will repeat and batch (522) a further set of instructions and send these to the diagnostic interface device, which again deals with the batch of instructions as described above. The waiting time will typically be determined to include the expected latency of the network.

If, during execution of the method, an error code is received (632) from the OBD system by the diagnostic interface device (110), the error code is transmitted (634) to the diagnostic server (160). If the diagnostic server (160) receives (534) an error code, it transmits (536) an error message to be displayed to the user on the display.

If the function has been completed (636) successfully, the diagnostic interface device (110) transmits (638) a message to that effect to the diagnostic server (160). The diagnostic server (160) receives (538) such a message, and transmits (540) a message to the user device to display to the user that the function has completed successfully.

It should be noted that timing parameters may include any one or more of a time required to execute a specific function, timing limitations of the communication protocol of the OBD system, and inter-byte and inter-packet gaps. If these timing parameters are not adhered to, transmission of data between the diagnostic interface device and vehicle OBD system may be unsuccessful. For this reason, batched instructions are transmitted to the diagnostic interface device, which in turn ensures that data is transmitted to the OBD system according to the relevant timing parameters. Instructions may then be transmitted in a suitable order and at the correct times to prevent a failure in communication, and the diagnostic interface device can also control the flow of instructions based on responses from the OBD system. While an OBD system is waiting for further instructions, the communication session component ensures that the communication session is kept alive. This prevents a time-out from occurring which would cause communication with the OBD to be lost.

If the batched instructions include an instruction to repeat one of the subset of the batch of instructions a predetermined number of times, the diagnostic server may be configured to transmit a batch of termination instructions when this number of times has been reached. The diagnostic interface device may instruct the server of the number of times that a function has been performed, alternatively the server may be configured to determine the time required to perform the instruction the number of times, and to transmit a termination instruction if no further information has been received from the diagnostic interface device during that time.

It should be noted that the display of the user device serves as a display and graphical user interface to the diagnostic interface device in the embodiment described above, by means of the user device connecting to the web server hosted on the diagnostic interface device. The display details are suitable for display on the display of the user device, and allows a user to interact with the displayed functions, buttons or the like. Displayed details may include a progress of a function, a status of the OBD or the function, information about a function, and the like. Information to be displayed may be contained in a batch of instructions, alternatively may be transmitted individually, for example the list of instructions executable by the ECU.

In some embodiments, the user device may provide a channel for the diagnostic interface device to connect to the diagnostic server. In this case, the diagnostic interface device may connect wirelessly or via a wired connection to the user device, and the user device may then facilitate communication of the diagnostic interface device with the diagnostic server over the open network.

In an alternative embodiment, the user device may itself be the diagnostic interface device. The user device may then include a diagnostic port connector for connecting to a diagnostic connection port, or a diagnostic connection port may be connectable to the user device.

In a further embodiment, the diagnostic interface device is incorporated into the OBD system of a vehicle and may always have a dedicated connection to the OBD system.

Then, only a connection to the diagnostic server over the open network will be required for the method and system to be implemented.

It is also envisaged that, instead of using a web browser, the user device may have an application installed thereon which is configured to, upon opening, access the web server on the diagnostic interface device.

While only a single service function, namely "Engine Coolant Light" was described above as an exemplary function, it should be noted that a multitude of service functions may be performed using a diagnostic interface device of the present invention. These service functions may be any function normally performed in a workshop, including, but not limited to, calibration functions such as idle actuator calibration and throttle position sensor calibration, or adaptation clearing or reset functions. The service functions may include configuration functions such as a so-called "showroom" and "shipping" mode, in which certain vehicle functionality is enabled or disabled. Output tests such as fan or injector tests may also form part of the possible functions, as well as coding for certain constraints such as display units, light timing, and the like.

Because all of the service functions are stored on the diagnostic server, there may not be a need to update the diagnostic interface device, particularly the diagnostic interface device firmware, when these parameters are changed. This may allow the addition, removal or altering of certain instructions without requiring direct access to all diagnostic interface devices. As a diagnostic interface device receives the possible functions from the diagnostic server before selecting a specific function, details of available functions may be independent of the diagnostic interface device. This also allows the diagnostic interface device to have minimal processing capability, as processing for the instructions to be provided to an OBD system, in particular batching, is performed at the diagnostic server. This may at least partially limits the cost of the diagnostic interface device.

The present invention allows for communication with a vehicle OBD system from a diagnostic server, over an open communications network such as the internet, to a diagnostic interface device in connection with a vehicle OBD system. The batching of instructions allow communication with a diagnostic server over a relatively high latency communication network such as the Internet. This may allow the server to be located a long way from the vehicle, such as on a different continent.

Figure 8A:
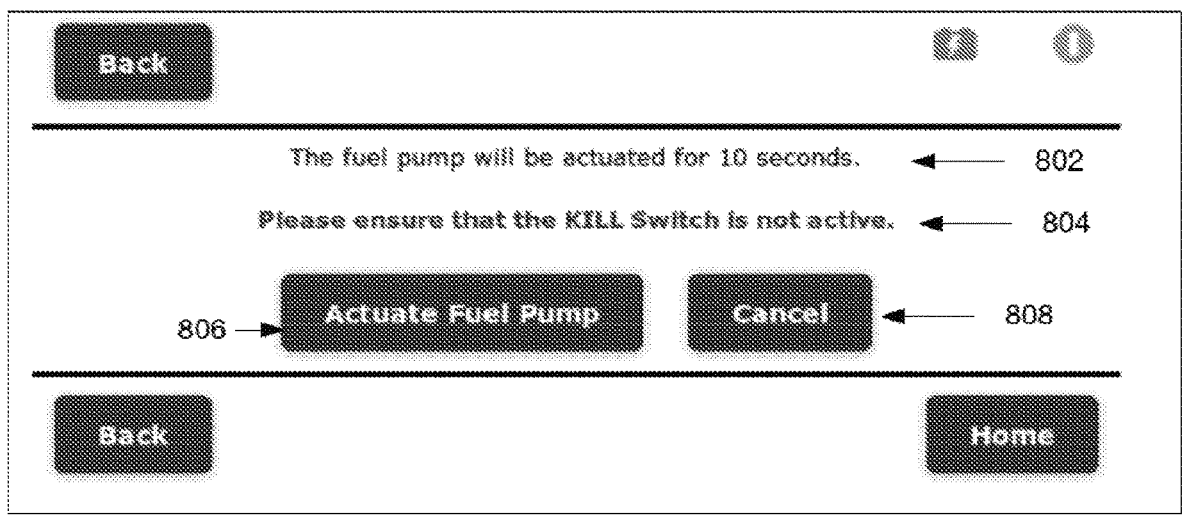
FIG. 8A to 8D are screen shots of specific displays of the user device during additional exemplary methods of transferring diagnostic commands.

FIG. 8A to 8D shows additional screenshots of the display associated with the diagnostic interface device. FIG. 8A shows information about an "Actuate Fuel Pump" function. The display includes a description (802) of the function, a warning (804), a button (806) to perform the action, and a button (808) to cancel the function.

Figure 8B:
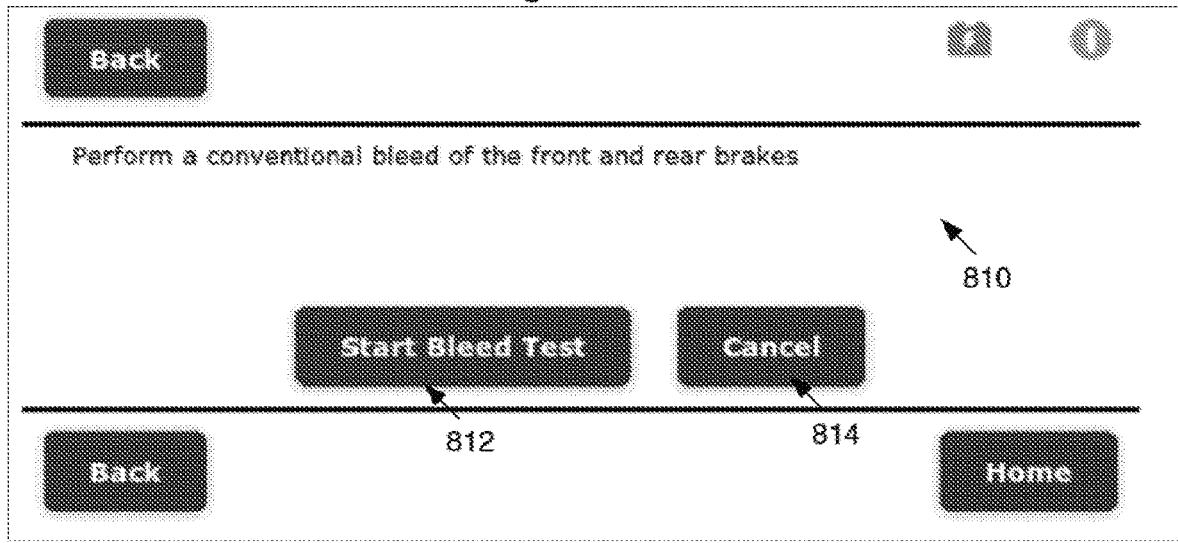

FIG. 8B shows information about a "Start Bleed Test" function. A description (810) is displayed, as well as a button (812) to perform, and a button (814) to cancel the function.

Figure 8C:
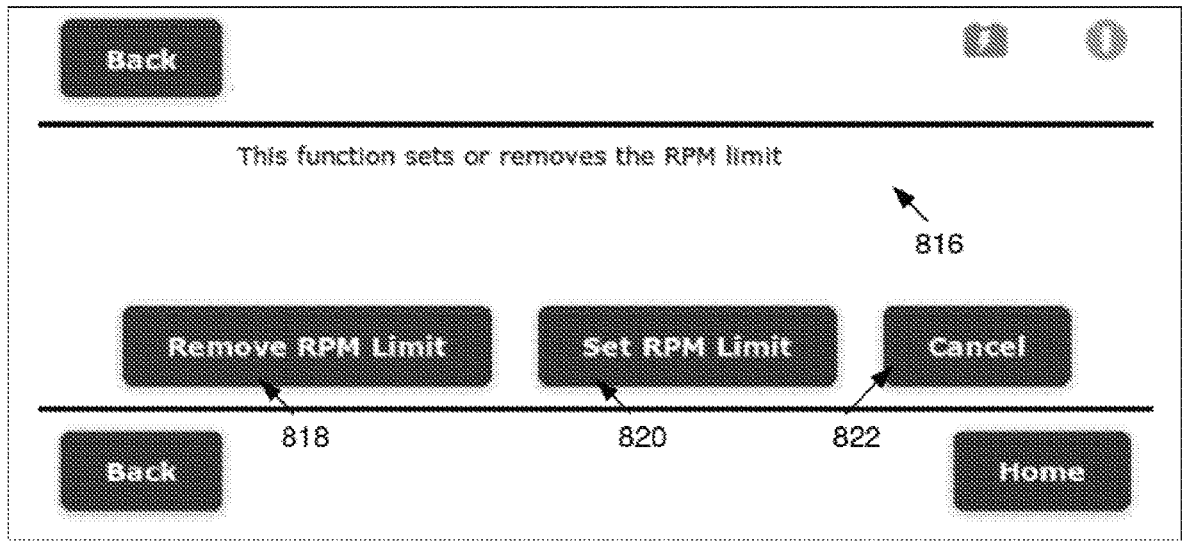

FIG. 8C shows information about "RPM Limit" functions. Information (816) about the functions are displayed, as well as a "Remove RPM Limit" button (818) to remove an RPM limit, a "Set RPM Limit" button (820) to set an RPM limit, and a "Cancel" button (822) to cancel the function.

Figure 8D:
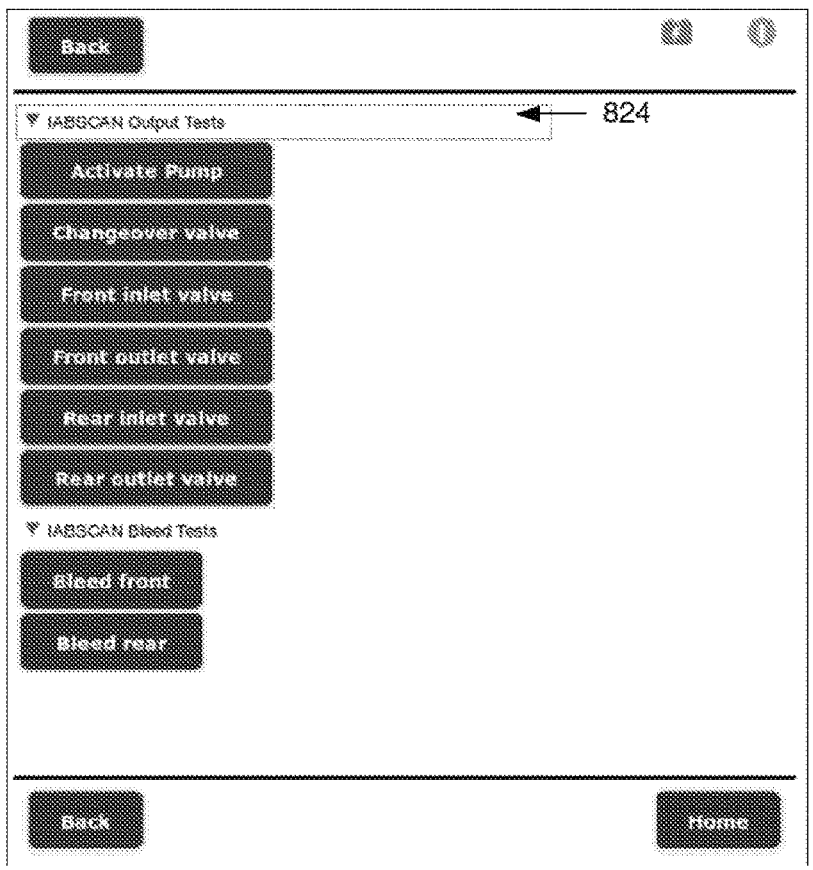

FIG. 8D shows a display after IABSCAN Output heading (824) was selected, and a list of functions falling under that heading expanded.

Figure 9:
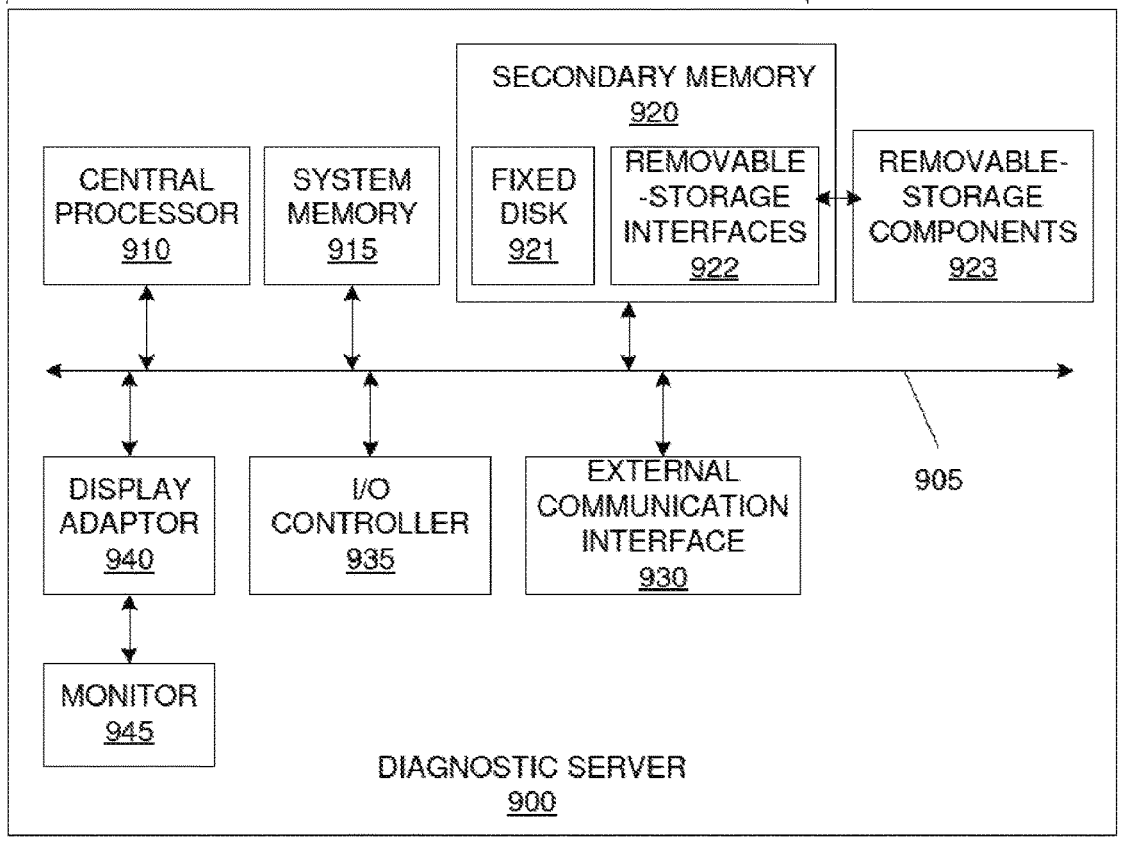
FIG. 9 illustrates an example of a diagnostic server in which various aspects of the disclosure may be implemented.

FIG. 9 illustrates an example of a diagnostic server (900) in which various aspects of the disclosure may be implemented. The diagnostic server (900) may be suitable for storing and executing computer program code. The various participants and elements in the previously described system diagrams may use any suitable number of subsystems or components of the diagnostic server (900) to facilitate the functions described herein. The diagnostic server (900) may include subsystems or components interconnected via a communication infrastructure (905) (for example, a communications bus, a cross-over bar device, or a network). The diagnostic server (900) may include one or more central processors (910) and at least one memory component in the form of computer-readable media. In some configurations, a number of processors may be provided and may be arranged to carry out calculations simultaneously. In some implementations, a number of diagnostic servers (900) may be provided in a distributed, cluster or cloud-based computing configuration and may provide software units arranged to manage and/or process data on behalf of remote devices.

The memory components may include system memory (915), which may include read only memory (ROM) and random access memory (RAM). A basic input/output system (BIOS) may be stored in ROM. System software may be stored in the system memory (915) including operating system software. The memory components may also include secondary memory (920). The secondary memory (920) may include a fixed disk (921), such as a hard disk drive, and, optionally, one or more removable-storage interfaces (922) for removable-storage components (923). The removable-storage interfaces (922) may be in the form of removable-storage drives (for example, magnetic tape drives, optical disk drives, etc.) for corresponding removable storage-components (for example, a magnetic tape, an optical disk, etc.), which may be written to and read by the removable-storage drive. The removable-storage interfaces (922) may also be in the form of ports or sockets for interfacing with other forms of removable-storage components (923) such as a flash memory drive, external hard drive, or removable memory chip, etc.

The diagnostic server (900) may include an external communications interface (930) for operation of the diagnostic server (900) in a networked environment enabling transfer of data between multiple diagnostic servers (900). Data transferred via the external communications interface (930) may be in the form of signals, which may be electronic, electromagnetic, optical, radio, or other types of signal. The external communications interface (930) may enable communication of data between the diagnostic server (900) and other diagnostic servers including servers and external storage facilities. Web services may be accessible by the diagnostic server (900) via the communications interface (930). The external communications interface (930) may also enable other forms of communication to and from the diagnostic server (900) including, voice communication, near field communication, radio frequency communications, such as Bluetooth™, etc.

The computer-readable media in the form of the various memory components may provide storage of computer-executable instructions, data structures, program modules, software units and other data. A computer program product may be provided by a computer-readable medium having stored computer-readable program code executable by the central processor (910). A computer program product may be provided by a non-transient computer-readable medium, or may be provided via a signal or other transient means via the communications interface (930).

Interconnection via the communication infrastructure (905) allows the central processor (910) to communicate with each subsystem or component and to control the execution of instructions from the memory components, as well as the exchange of information between subsystems or components. Peripherals (such as printers, scanners, cameras, or the like) and input/output (I/O) devices (such as a mouse, touchpad, keyboard, microphone, and the like) may couple to the diagnostic server (900) either directly or via an I/O controller (935). These components may be connected to the diagnostic server (900) by any number of means known in the art, such as a serial port. One or more monitors (945) may be coupled via a display or video adapter (940) to the diagnostic server (900).

The foregoing description has been presented for the purpose of illustration; it is not intended to be exhaustive or to limit the invention to the precise forms disclosed. Persons skilled in the relevant art can appreciate that many modifications and variations are possible in light of the above disclosure.

Any of the steps, operations, components or processes described herein may be performed or implemented with one or more hardware or software units, alone or in combination with other devices. In one embodiment, a software unit is implemented with a computer program product comprising a non-transient computer-readable medium containing computer program code, which can be executed by a processor for performing any or all of the steps, operations, or processes described. Software units or functions described in this application may be implemented as computer program code using any suitable computer language such as, for example, Java™, C++, or Perl™ using, for example, conventional or object-oriented techniques. The computer program code may be stored as a series of instructions, or commands on a non-transitory computer-readable medium, such as a random access memory (RAM), a read-only memory (ROM), a magnetic medium such as a hard-drive, or an optical medium such as a CD-ROM. Any such computer-readable medium may also reside on or within a single computational apparatus, and may be present on or within different computational apparatuses within a system or network.

Flowchart illustrations and block diagrams of methods, systems, and computer program products according to embodiments are used herein. Each block of the flowchart illustrations and/or block diagrams, and combinations of blocks in the flowchart illustrations and/or block diagrams, may provide functions which may be implemented by computer readable program instructions. In some alternative implementations, the functions identified by the blocks may take place in a different order to that shown in the flowchart illustrations.

The language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

Finally, throughout the specification and claims unless the contents requires otherwise the word 'comprise' or variations such as 'comprises' or 'comprising' will be understood to imply the inclusion of a stated integer or group of integers but not the exclusion of any other integer or group of integers.

The invention claimed is:

1. A method for transferring diagnostic commands to an on-board diagnostics (OBD) system of a vehicle, the method performed at a diagnostic server which is in data communication with a diagnostic interface device over an open network, the diagnostic interface device being connected to the vehicle OBD system by means of a dedicated connection, the method comprising:
   receiving, from the diagnostic interface device, details of an electronic control unit (ECU) associated with the OBD system;
   retrieving a list of functions executable by the ECU from a database,
   transmitting, to the diagnostic interface device, the list of functions executable by the ECU;
   receiving, from the diagnostic interface device, an indication of a function selected from the list of executable functions; and
   transmitting a batch of instructions to the diagnostic interface device for performing the selected function, the batch of instructions including timing parameters specific to each instruction within the batch, so that the diagnostic interface device is capable of transferring each instruction in the batch to the vehicle OBD system over the dedicated connection in accordance with the timing parameters in order to carry out the instructions in a specific order and within specific timeframes.

2. The method as claimed in claim 1, including a step of transmitting a further batch of instructions to the diagnostic interface device, the further batch of instructions including a configuration file instruction for facilitating readying of the timing parameters for the function.

3. The method as claimed in claim 1, including the steps of:
   transmitting an initial batch of instructions to the diagnostic interface device, the initial batch of instructions including a request for ECU parameters;
   receiving the requested ECU parameters; and
   analyzing the ECU parameters to confirm that they allow for the function to be performed before transmitting the batch of instructions for performing the selected function.

4. The method as claimed in claim 1 wherein the batch of instructions includes an instruction to keep a communication session alive.

5. The method as claimed in claim 1, including the step of:
   responsive to receiving a user termination action indicator, transmitting instructions to facilitate termination of the function to the diagnostic interface device.

6. The method as claimed in claim 1, including the step of:
   responsive to a predetermined waiting time expiring before a user termination action is performed, transmitting further instructions to the diagnostic interface device;
   responsive to receiving an error code from the diagnostic interface device, transmitting an error message to the diagnostic interface device; and
   responsive to receiving a function completed indicator, transmitting a function completed message to the diagnostic interface device.

7. The method as claimed in claim 1 wherein the timing parameters include one or more of: time required to execute the function, timing limitations of a communication protocol of the OBD system, and inter-byte and inter-packet gaps.

8. The method as claimed in claim 1, wherein the batch of instructions includes a collection of commands to initiate a diagnostic session, to perform the specific function, to wait for a certain time unless a user termination action has been performed, and an instruction to repeat a subset of the current batch a predetermined number of times.

9. The method as claimed in claim 8, including the step of: responsive to the subset of the batch having been performed the predetermined number of times, transmitting commands to facilitate termination of the function to the diagnostic interface device.

10. The method as claimed in claim 9, wherein the commands to facilitate termination of the function include instructions to terminate a current function, to read any error codes, and to stop the diagnostic session.

11. The method as claimed in claim 1, wherein the list of functions executable by the ECU is transmitted in a format suitable for display on a display associated with the diagnostic interface device; and wherein batched instructions transmitted to the diagnostic interface device include detail to be displayed on the display.

12. A method for transferring diagnostic commands to an on-board diagnostics (OBD) system of a vehicle, the method performed at a diagnostic interface device connected to the OBD system via a dedicated connection and in data communication with a diagnostic server over an open network, the method including the steps of:
    transmitting, to the diagnostic server, details of an ECU associated with the OBD system;
    receiving, from the diagnostic server, a list of functions executable by the ECU;
    receiving, from a user, an indication of a function in the list to be provided to the OBD;
    transmitting, to the diagnostic server, the indication of the function;
    receiving a batch of instructions from the diagnostic server for performing the selected function, the batch of instructions including timing parameters specific to each instruction within the batch; and
    transferring each instruction in the batch to the OBD system in accordance with the timing parameters in order to carry out the instructions in a specific order and within specific timeframes.

13. The method as claimed in claim 12, including the steps of:
    receiving a configuration file instruction from the diagnostic server, the configuration file facilitating readying of timing parameters for the instruction; and
    loading the configuration file into a memory.

14. The method as claimed in claim 12, including the steps of: receiving, from the diagnostic server, an initial batch of instructions, the initial batch including a request for ECU parameters; transmitting the request for the ECU parameters to the OBD system; receiving the ECU parameters from the OBD system; and transmitting the ECU parameters to the diagnostic server in a batched format.

15. The method as claimed in claim 12, including the steps of:
    responsive to receiving a user termination action, transmitting a user termination indicator to the diagnostic server;
    responsive to receiving an error code from the OBD system, transmitting the error code to the diagnostic server; and
    responsive to recognizing that a function is completed, transmitting a function completed indicator to the diagnostic server.

16. The method as claimed in claim 12, including the step of: responsive to receiving details to be displayed on a display associated with the diagnostic interface device as part of the batched instructions, sending the details to the display.

17. The method as claimed in claim 12, including the steps of:
    in response to the OBD system responding to an instruction with a response that the instruction cannot be performed now, waiting a predetermined amount of time and repeating the specific instruction; and
    in response to the OBD system responding to an instruction with a response that the instruction has been received but the OBD system cannot respond now, waiting a predetermined amount of time for the response.

18. A diagnostic interface device for transferring diagnostic commands to an on-board diagnostics (OBD) system of a vehicle, comprising:
    a physical interface for communicating with the OBD system over a dedicated network;
    a communication interface for communicating with a diagnostic server over an open network; and
    a processing module, wherein the processing module includes:
        a list receiving component for receiving a list of functions from the diagnostic server;
        a user input component for receiving, from a user, an indication of a function in the list to be provided to the OBD system;
        a function transmitting component for transmitting an indication of the function to the server;
        an instruction receiving component for receiving a batch of instructions from the diagnostic server, the batch of instructions including timing parameters specific to each instruction within the batch; and
        an OBD system transferring component for transferring each instruction in the batch to the OBD system in accordance with the timing parameters in order to carry out the instructions in a specific order and within specific timeframes.

* * * * *